United States Patent [19]
Leitzke et al.

[11] Patent Number: 5,784,760
[45] Date of Patent: Jul. 28, 1998

[54] RETAINING MECHANISM FOR SECURING CONNECTING MEMBERS

[75] Inventors: Rue Leitzke, Hustisford; Harry Swenson, Beaver Dam; Roman Baus, Rubicon, all of Wis.; Frank Lodi, Niles, Ill.

[73] Assignee: Pivot Point, Inc., Hustisford, Wis.

[21] Appl. No.: 815,271

[22] Filed: Mar. 10, 1997

[51] Int. Cl.[6] .................... A44B 21/00; A45F 5/00
[52] U.S. Cl. .................. 24/3.13; 24/3.6; 24/17 B; 24/30.5 P
[58] Field of Search .............. 24/3.13, 3.6, 3.1, 24/3.3, 3.4, 30.5, 17 B, 114.6; 248/102

[56] References Cited

U.S. PATENT DOCUMENTS

| | | | |
|---|---|---|---|
| 738,462 | 9/1903 | Lincoln | 24/17 B |
| 1,368,156 | 2/1921 | Jackson | 24/3.6 |
| 2,637,515 | 5/1953 | Walsh | 248/102 |
| 3,580,793 | 5/1971 | Hewitt | 24/114.6 |
| 4,441,233 | 4/1984 | Swift | 24/30.5 P |
| 4,765,037 | 8/1988 | Perry | 24/3.13 |
| 5,497,818 | 3/1996 | Marcarelli | 24/3.13 |

Primary Examiner—Victor N. Sakran
Attorney, Agent, or Firm—Wheeler Kromholz & Manion

[57] ABSTRACT

A retaining mechanism or lanyard for retaining a connecting member proximate to a point of connection. A flexible elongated member has an eyelet or loop on a first end, a connector having a connecting pin on the opposite end and a receptacle in between. The connecting member is placed between the connector and receptacle after which the connector is snap fit into the receptacle. The lanyard has unitary construction from a plastic material and requires no additional components during fabrication.

12 Claims, 2 Drawing Sheets

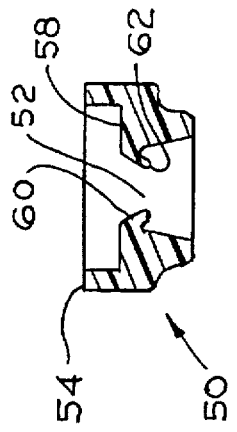
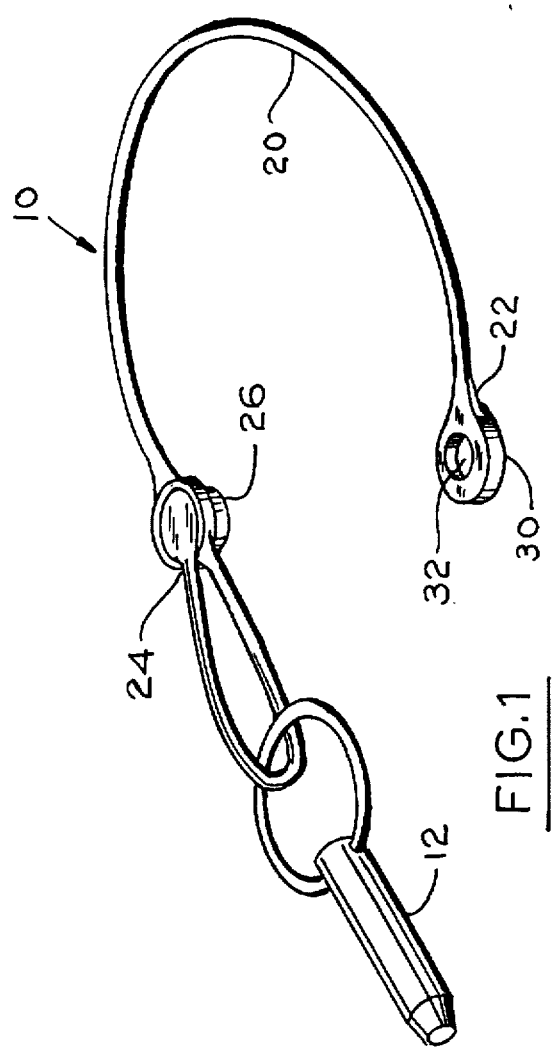
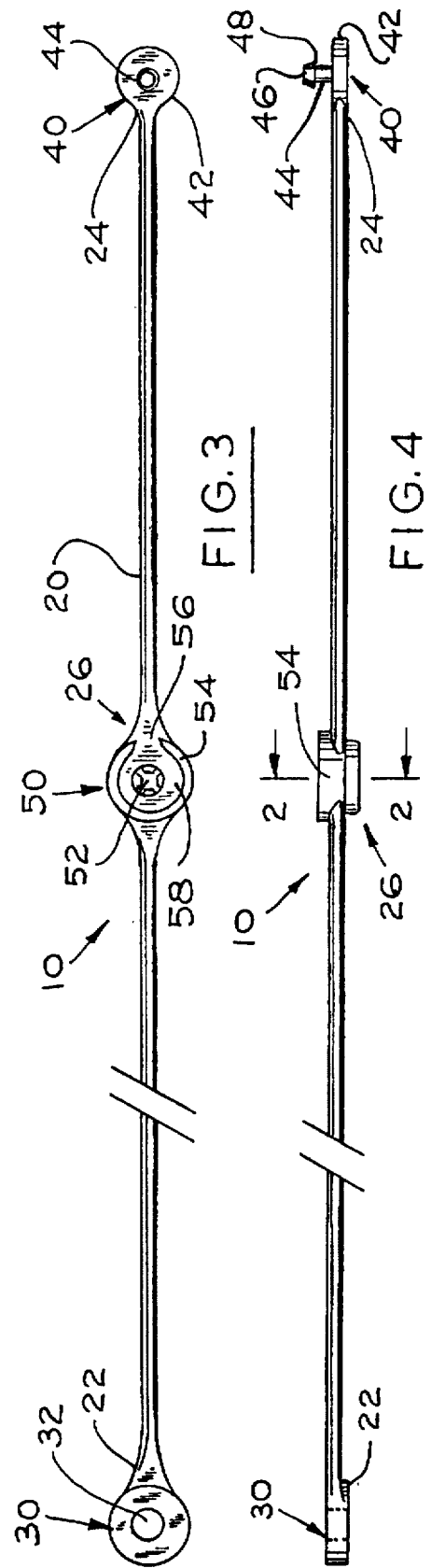

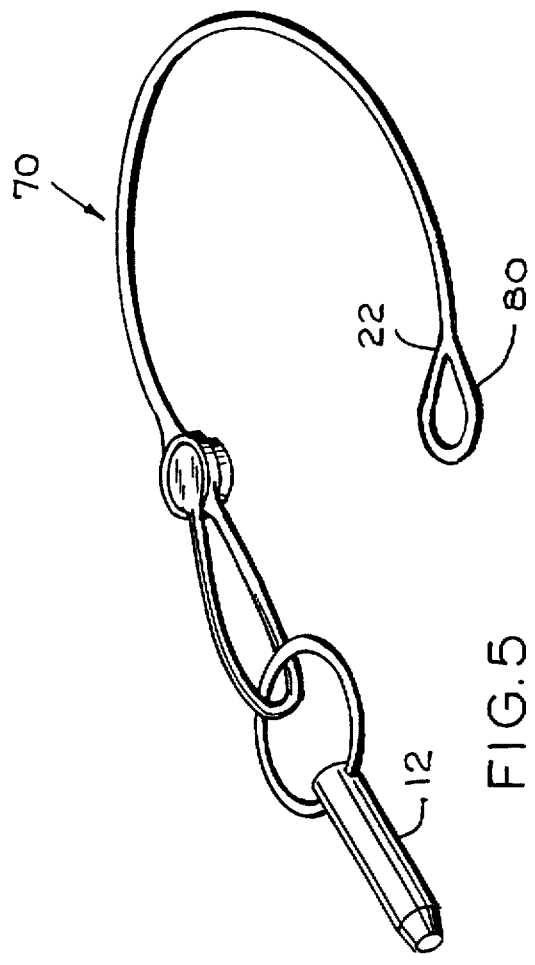
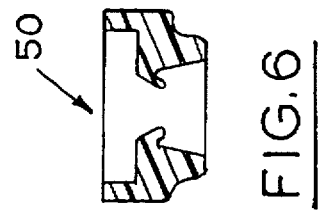
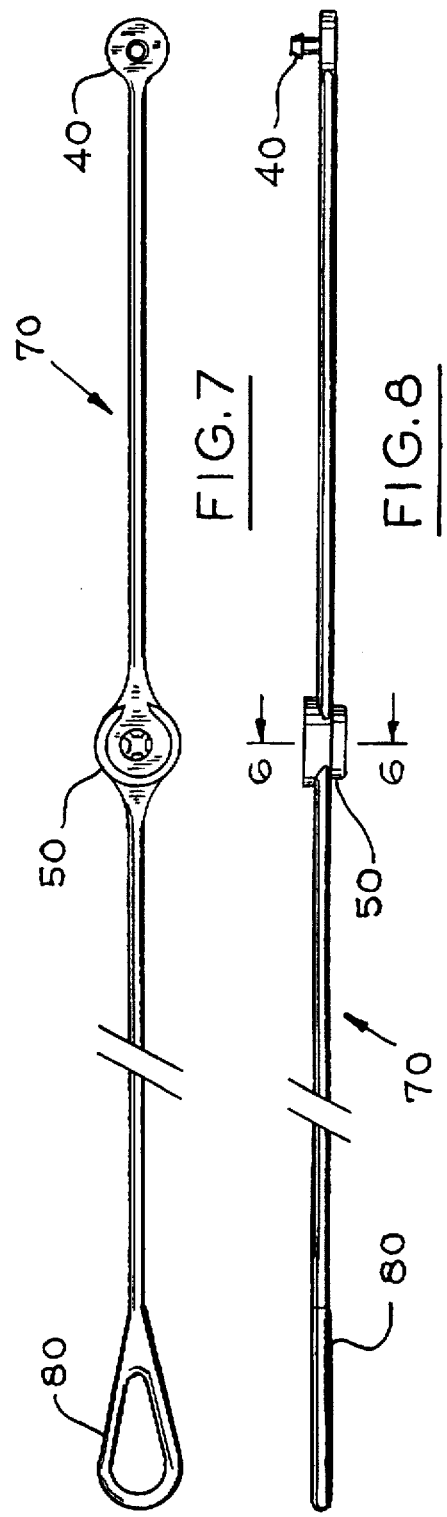
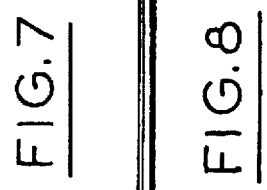

RETAINING MECHANISM FOR SECURING CONNECTING MEMBERS

BACKGROUND OF THE INVENTION

The present invention relates generally to the field of retaining mechanisms for retaining connecting members and the like proximate to a point of connection. Specifically, the invention relates to a novel structure for a lanyard. A lanyard can be defined as a short rope or cord used for holding or fastening something, typically a tool or a connecting member. Lanyards have many applications including in the fields of machinery, buildings, vehicles, ships and boats, farm equipment, and agricultural implements.

Prior art lanyards have been constructed from rope, cable and chain. Further, they require additional structures such as crimps or clasps so that the lanyard can be readily attached a piece of machinery and so that the lanyard can properly retain its connection member. Typically, each end of the rope, cable or chain is formed into a loop and reattached to itself to provide a means for attaching one end of the lanyard to the stationary structure and to provide a retaining means for the retained member. Alternatively, a connecting member can be attached to one end to provide a means for attaching the lanyard to the stationary structure. These additional components add to the overall cost of the lanyard on both a material and manufacturing basis.

Another draw back in the prior art includes the fact that known lanyards have poor durability in harsh environments. For example, a rope lanyard is likely to rot in a wet or humid environment. A lanyard constructed from steel cable or chain can damage a piece of machinery and ruin its surface finish if the lanyard rubs or vibrates against the machinery. These and other undesirable results commonly occur with prior art devices.

It is an object of our invention to provide a lanyard that is of unitary construction. No additional components such as a crimp, clasp or connector are required. It is a further object to provide a lanyard fabricated from a nylon material which allows the lanyard to be flexible yet durable in all types of environments. The nylon material also prevents damage to whatever structure the lanyard is attached. It is yet a further object to provide a lanyard that is of low cost to manufacture and that is easy to use. Finally, it is an object of our invention to provide a lanyard which has an aesthetically pleasing appearance. These and other benefits of our invention will become evident in the descriptions that follow.

SUMMARY OF THE INVENTION

The present invention can be described as a retaining apparatus for retaining a work piece within a predetermined distance from a work piece receptacle. In one embodiment, our invention comprises a generally elongated flexible member having a proximate end and a distal end, an eyelet having an aperture formed therein being connected to the flexible member proximate end, a keeper having a keeper pin attached thereto, the keep being connected to the flexible member distal end, a keep receiver having a retaining aperture being located between the distal and proximate ends of the flexible member, and the retaining aperture being sized to retain said keeper pin within said aperture.

In our preferred embodiment, the eyelet has an annular shape. The keeper pin discussed above has a predetermined diameter and a keeper pin end. The pin end has an annular tapered end which has a small diameter and a large diameter. The small diameter is less than the diameter of the retaining aperture while the large diameter is greater than the diameter of the keeper pin and slightly greater than the diameter of the retaining aperture. The keeper receiver retaining aperture includes at least two prongs and these prongs are attached circumferentially about the retaining aperture. Once the keeper pin has passed through the retaining aperture, the ends of the prongs engage with the annular tapered end of the pin and prevent the removal of the keeper from the keeper receiver. The retaining apparatus is unitarily fabricated from a plastic material. The plastic material could be, but is not limited to, nylon 6/6 or UV stabilized ST801 nylon.

In another embodiment, our invention could be described as an apparatus for retaining a retained member within a predetermined area from at least one receptacle for said retained member. The invention comprises a flexible band of material having a first end and a second end. An eyelet having an aperture formed therein is formed at the first end of the band. A two piece snap mechanism is formed at the second end. The snap mechanism includes a plug end having a plug pin and a receptacle having a receptacle aperture. The plug pin is sized to be locked within the receptacle aperture.

An alternative embodiment of our invention comprises a flexible elongated member having a first end and a second end. The first end is bonded to a predetermined portion of the elongated member to form a loop at the first end. A connector, similar to the connectors described above, is formed at the second end. The connector includes a connector pin which projects a predetermined height perpendicular to the connector. A coupling is also provided to receive the connector. The coupling includes a coupling aperture which is sized to lockably receive the connector pin. The coupling aperture may include a plurality of locking fingers which project perpendicular to the plane of the aperture. The pin may have tapered annular portion on its end such that the greatest diameter of the tapered portion is greater than the closure formed by the fingers. After the pin is passed through the aperture and past the fingers, the fingers engage with the tapered portion and lock the connector into the coupling.

DESCRIPTION OF THE DRAWINGS

FIG. 1 is a perspective view of a first embodiment of our invention showing its application to a pull pin.

FIG. 2 is a cut away view taken at line 2—2 of FIG. 4.

FIG. 3 is a top plan view of the first embodiment of our invention.

FIG. 4 is a front elevational view of the first embodiment of our invention.

FIG. 5 is a perspective view of a second embodiment of our invention showing its application to a pull pin.

FIG. 6 is a cut away view taken at line 6—6 of FIG. 8.

FIG. 7 is a top plan view of the second embodiment of our invention.

FIG. 8 is a front elevational view of the second embodiment of our invention.

DETAILED DESCRIPTION

Although the disclosure hereof is detailed and exact to enable those skilled in the art to practice the invention, the physical embodiments herein disclosed merely exemplify the invention which may be embodied in other specific structure. While the preferred embodiment has been described, the details may be changed without departing from the invention, which is defined by the claims.

The invention, shown generally by reference numerals 10 and 70 in FIGS. 1 through 8, comprises a nylon lanyard for retaining or securing a connecting member within a predetermined distance from its receptacle or receptacles. The lanyard 10 or 70 is fixedly attached to a structure such as a building or piece of machinery. Our first embodiment 10 is shown in FIGS. 1 through 4 and our second embodiment 70 is shown in FIGS. 5 through 8. An application of the invention 10 and 70 is shown in FIGS. 1 and 5. The lanyard 10/70 is shown retaining a draw pin 12. Draw pin 12 may be used to complete a coupling or to interlock two machine components. In its application, it is important that draw pin 12 be flexibly maintained within reach of the coupling or interlocking components.

Our lanyard 10 comprises an elongated flexible member or band 20 that has a first end 22 and a second end 24. The member 20 is fabricated from a flexible material such as nylon 6/6 or UV stabilized ST801 nylon.

Referring to FIGS. 1, 3, and 4, an eyelet 30 is attached or molded to first end 22 of elongated flexible member 20. Eyelet 30 has an annular shape and includes an aperture 32 formed therein. Aperture 32 can receive a screw, rivet or other fastener for the purpose of connecting the lanyard 10 a structural member. The structural member could be a machine, an implement, etc.

At the opposite or second end 24 of elongated member 20, a connector 40 is attached or molded. Connector 40 is best shown in FIGS. 3 and 4 and can be seen to have a flat round head 42 and a connector pin 44. Pin 44 projects substantially perpendicular from the central region of one side of head 42 and has a pinhead 46 at its distal end 48. Pinhead 46 is tapered such that its smallest diameter is substantially equivalent to the diameter of connector pin 44 and its greatest diameter is greater than the diameter of connector pin 44. The purpose of this design will become evident in the description of assembly below.

At the midsection 26, or anywhere along the length of member 20, there is formed a receptacle 50. Receptacle 50 is best shown in FIGS. 3 and 4 and can be seen to include an aperture 52. Aperture 52 is sized to receive connector pin 44. About the circumference of receptacle 50 is an arcuate wall 54. Arcuate wall 54 is upstanding and substantially concentric about aperture 52. Because the ends of arcuate wall 54 do not join one another, a gap 56 is formed. Gap 56 is best seen in FIG. 3. Perpendicular to and in the interior of arcuate wall 54 is a substantially flat annular portion 58. Projecting from the interior of annular portion 58 and through aperture 52 is a plurality of retaining fingers 60. In our preferred embodiment, four retaining fingers 60 are utilized. As best shown in FIG. 3, each retaining finger 60 has an end 62

The connector 40 and receptacle 50 fit together to provide a closure for retaining the connecting member 12 as follows. First, the connecting member to be retained, such as draw pin 12, is threaded onto elongated member 20 and positioned between connector 40 and receptacle 50. Next, connector 40 is bent in an arcuate fashion such that connector pin 44 is aligned with receptacle aperture 52. Connector head 42 is then depressed into receptacle 50 such that the tapered pinhead 46 of pin 44 passes into aperture 52 and past retaining fingers 60 and snaps into place. The interference fit of retaining fingers 60 and pinhead 46 maintain the connector 40 and receptacle 50 in a locked relationship. It is also important to note that connector head 42 fits within arcuate wall 54 and that elongated member end 24 passes through gap 56. Thus, as shown in FIG. 1, a flush closed assembly results.

FIGS. 5 through 8 depict a second embodiment of our invention that is generally referred to at reference numeral 70. Its structure is nearly identical to that of embodiment 10 with the exception of eyelet 30. The embodiment shown at 70 replaces eyelet 10 with a loop of the band or elongated member 20. A predetermined amount of elongated member 20 is simply formed into a loop at end 22. End 22 is fused or boned to member 20. The resulting loop structure 80 provides yet another means for securing the lanyard 70 to a machine or implement.

Both embodiments 10 and 70 are molded in unitary construction from a plastic material such as nylon 6/6 or UV stabilized ST801 nylon. Our lanyard 10 and 70 requires no additional components during fabrication.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

What is claimed is:

1. A retaining apparatus for retaining a work piece within a predetermined distance from a work piece receptacle, the retaining apparatus comprising:

a generally elongated flexible member having a proximate end and a distal end, an eyelet structure having an aperture formed therein, said eyelet structure being connected to the proximate end of the generally elongated flexible member;

a keeper having a keeper pin attached thereto, said keeper being connected to the distal end of the generally elongated flexible member;

said keeper pin having an annular tapered distal end portion defining a radially extending locking shoulder, a releasable receptacle having a retaining aperture, said receptacle being located between said proximate end and said distal end, said aperture being sized to retain said keeper pin within said aperture, and including at least two keeper retaining prongs, said prongs being formed circumferentially about the retaining aperture and extending radially inwardly therein, each of said prongs including a downwardly depending distal finger portion arranged to releasable retain said locking pin shoulder when said keeper pin has been inserted within said aperture.

2. The apparatus of claim 1 wherein the apparatus is unitarily fabricated from a plastic material.

3. The apparatus of claim 1 wherein the eyelet structure has an annular shape.

4. The apparatus of claim 1 wherein the eyelet is formed by fusing the distal end of the elongated member to a predetermined portion of the elongated member.

5. The apparatus of claim 1, wherein the keeper has a relatively flat base including an upstanding peripheral wall, said peripheral wall being interrupted to receive the eyelet and a portion of the proximate end of said elongated flexible member attached to said eyelet structure within the confines of the supporting wall.

6. An apparatus for retaining a retained member within a predetermined area from at least one receptacle for said retained member, the apparatus comprising:

a flexible band of material having a first end and a second end; an eyelet having an aperture formed therein, the eyelet being formed at the first end;

a snap mechanism being formed at the second end, the snap mechanism including a plug having a plug pin and a releasable receptacle having a receptacle aperture, the plug pin being sized to be releasably locked within the receptacle aperture;

said plug pin having an annularly tapered distal end portion defining a radially extending locking shoulder;

said receptacle aperture being sized to retain said plug pin within said aperture, and including at least two plug retaining prongs, said prongs being formed circumferentially about the retaining aperture and extending radially inwardly therein, each of said prongs including a downwardly depending distal finger portion arranged to releasably retain said locking shoulder when said plug pin has been inserted within said aperture.

7. The apparatus of claim 6 wherein the apparatus is unitarily fabricated from a plastic material.

8. The apparatus of claim 6 wherein the eyelet has an annular shape.

9. The apparatus of claim 6 wherein the eyelet is formed by fusing the first end of the elongated member to a predetermined portion of the elongated member.

10. The apparatus of claim 6, wherein the keeper has a relatively flat floor defined by an upstanding peripheral wall, said peripheral wall being interrupted to receive the eyelet and a portion of the proximate end of said elongated flexible member attached to said eyelet structure within the confines of the supporting wall.

11. An apparatus for securing a retaining member within a predetermined distance from at least one receptacle for said retaining member, the apparatus comprising:

a flexible elongated member having a first end and a second end;

said first end being bonded to a predetermined portion of said elongated member to form a loop;

a connector being formed at the second end;

said connector including a connector pin, said connector pin being substantially perpendicular to said connector;

a coupling arranged to receive said connector and having an aperture formed therein sized to lockably receive said connector pin, said coupling being formed between said first end and said second end;

said connector pin having an annular tapered distal end portion defining a radially extending locking should;

said aperture being sized to retain said connector pin within said aperture, and including at least two connector pin retaining prongs, said prongs being formed circumferentially about the retaining aperture and extending radially inwardly therein, each of said prongs including a downwardly depending distal finger portion arranged to releasably retain said connector pin shoulder when said connector pin has been inserted within said aperture.

12. The apparatus of claim 11 wherein the apparatus is unitarily fabricated from a plastic material.

\* \* \* \* \*